United States Patent [19]

Okada

[11] Patent Number: 5,148,105
[45] Date of Patent: Sep. 15, 1992

[54] ELECTROMAGNETIC ROTATION SENSOR

[75] Inventor: Takamichi Okada, Hanno, Japan

[73] Assignee: Shindengen Electric Manufacturing Co., Ltd., Japan

[21] Appl. No.: 806,260

[22] Filed: Dec. 13, 1991

[30] Foreign Application Priority Data

Dec. 25, 1990 [JP] Japan ............................... 2-404128[U]

[51] Int. Cl.⁵ .......................... G01B 7/30; G01P 3/488
[52] U.S. Cl. .............................. 324/207.14; 374/174; 374/262; 73/519
[58] Field of Search ................... 324/173, 174, 207.11, 324/207.14, 207.15, 207.20, 207.21, 207.22, 207.25, 260–262; 73/518, 519; 310/168; 188/181 R

[56] References Cited

U.S. PATENT DOCUMENTS

| | | | |
|---|---|---|---|
| 4,595,897 | 6/1986 | Amano et al. | 324/174 X |
| 4,797,612 | 1/1989 | Nakanishi et al. | 324/174 X |
| 4,847,557 | 7/1989 | Saito et al. | 324/173 X |
| 4,888,551 | 12/1989 | Hata et al. | 324/174 X |
| 4,901,562 | 2/1990 | Beakas et al. | 324/174 X |
| 4,904,936 | 2/1990 | Richmond | 324/174 |
| 4,954,775 | 9/1990 | Richmond | 324/174 |

FOREIGN PATENT DOCUMENTS

| | | |
|---|---|---|
| 63-16601 | 7/1988 | Japan . |
| 1-175502 | 7/1989 | Japan . |
| 2-195264 | 8/1990 | Japan . |

*Primary Examiner*—Kenneth A. Wieder
*Assistant Examiner*—W. S. Edmonds
*Attorney, Agent, or Firm*—Finnegan, Henderson, Farabow, Garrett & Dunner

[57] ABSTRACT

An electromagnetic rotation sensor for detecting a rotational speed of a rotating member includes a sensor portion and a connector portion which are molded of a resin to provide a resin-molded structure. The resin-molded structure is received in a cover, with the connector portion extending outwardly from the cover through a sensor portion-positioning hole formed through a wall of the cover. In order to prevent a positional displacement of the sensor portion with respect to a detection gear, connected to the rotating member, when fixedly mounting the cover on the resin-molded structure, a primary molded portion is molded to provide the sensor portion, and then the primary molded portion is inserted into the cover, and then a secondary molded portion is molded to form the connector portion on the primary molded portion in such a manner that a peripheral edge portion of the sensor portion-positioning hole is fixedly held between the primary molded portion and the secondary molded portion. With this arrangement, the cover can be fixed to the sensor portion and the connector portion without the need for compressive deformation or the like of the cover.

5 Claims, 3 Drawing Sheets

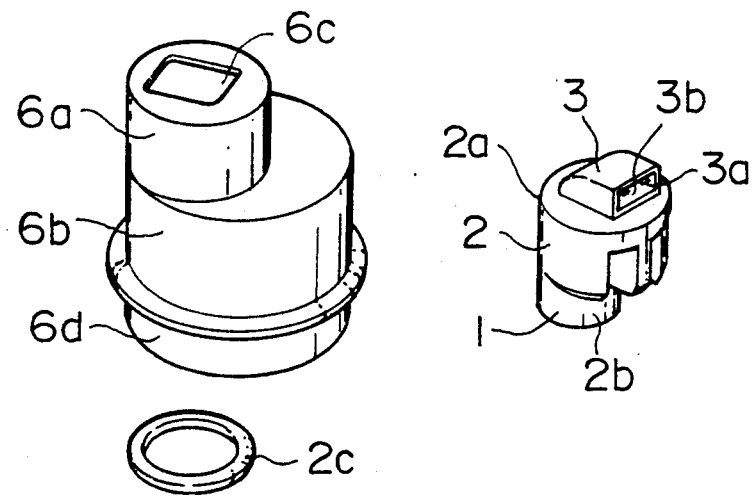
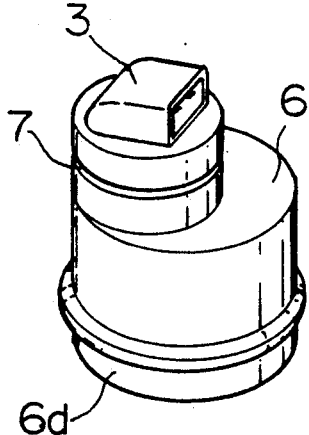
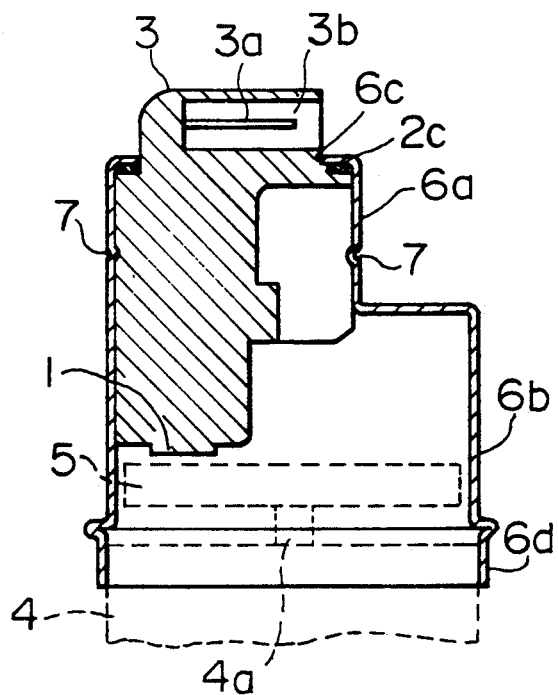

ELECTROMAGNETIC ROTATION SENSOR

BACKGROUND OF THE INVENTION

This invention relates to an electromagnetic rotation sensor, and more particularly to a construction of fixing a cover of the rotation sensor.

There is known an electromagnetic sensor of a construction described below. As shown in FIG. 3, this sensor comprises a sensor portion 2 having a detection portion 1, and a connector portion 3 having contacts 3a for connection to an external circuit, the contacts 3a being exposed at the upper end of the sensor portion 2. The sensor portion 2 includes an upper larger-diameter portion 2a, and a lower smaller-diameter portion 2b having the detection portion 1 disposed in eccentric relation to the larger-diameter portion 2a. The sensor portion 2 and the connector portion 3 are molded of a resin integrally with each other in such a manner that the connector portion 3 has an socket portion 3b into which a mating connector is adapted to be inserted. A cover 6 includes a smaller-diameter portion 6a for receiving the larger-diameter portion 2a of the sensor portion 2, and a larger-diameter portion 6b for receiving a detection gear connected coaxially to a rotating member whose rotational speed is to be detected or measured, the smaller-diameter portion 2b of the sensor portion 2 being eccentric from the larger-diameter portion 6b of the cover 6. A sensor portion-positioning hole 6c is formed through an upper end wall of the cover 6. As shown in FIGS. 4A and 4B, the larger-diameter portion 2a of the sensor portion 2 is inserted into the smaller-diameter portion 6a of the cover 6 through a packing 2c, with the connector portion 3 extending through the sensor portion-positioning hole 6c. Then, the smaller-diameter portion 6a of the cover 6 is compressively deformed at a plurality of circumferentially-spaced points or over the entire circumference thereof (In FIG. 4, this portion 6a is compressively deformed over the entire circumference thereof, as shown by 7, thereby fixing the cover 6 to the sensor portion 2 to prevent the cover 6 from becoming disengaged from the sensor portion 2. The sensor is used in the following manner to detect the rotational speed (the number of revolution) of the rotating member.

As shown by broken lines in FIG. 4B, a connection portion 6d of the cover 6 is fixed to a rotating member guide 4 (which guides the above rotating member), so that the surface of the detection portion 1 of the sensor portion 2 is disposed in opposed relation to the detection gear 5 fixedly mounted on a rotation shaft 4a coaxial with the rotating member guide 4. For example, the detection gear 5 has alternate radial projections 5a and recesses 5b arranged at equal intervals, as shown in FIGS. 5A and 5B. A change in the gap between the detection portion 1 and the detection gear 5 in response to the rotation of the rotation shaft 4a (that is, a change in magnetic flux) is converted into pulses, and is outputted to the connector portion 3, and the rotational speed is measured, for example, by counting the number of output pulses for a predetermined time period.

In this conventional rotation sensor, in order to obtain accurate measurement results, the centerline (axis) of the detection portion 1 should be parallel to the centerline of the cover 6, and also the larger-diameter portion 6b of the cover 6 having the connection portion 6d should be coaxial with the detection gear 5, so that the gap between the detection portion 1 and the projections 5a of the detection gear 5 can always be kept constant during one revolution. For example, when the gap between the surface of the detection portion 1 and the end surface of the projection 5a of the detection gear 5 varies, the value of the output of the sensor portion becomes small, so that the detection accuracy is worsened. In addition, in the conventional sensor, even if dimensional accuracies of the cover 6 and the sensor portion 2 are enhanced, it is difficult to prevent a positional displacement between the cover 6 and the sensor portion 2 when assembling and fixing them together. Therefore, it is difficult to satisfy the above requirements, and also since the positional displacement can vary from one product to another, variations in characteristics from one product to another can not be avoided.

More specifically, in the conventional electromagnetic rotation sensor, the cover 6, when compressively deformed for clamping purposes, is deformed such that the longitudinal dimension thereof is changed, and also the sensor portion 2 is displaced out of position. And besides, the longitudinal dimension of the cover 6 is varied depending on variations in the compressive deformation force. Further, the cover 6 may be distorted.

For these reasons, it is difficult to control the gap between the detection gear 5 and the detection portion 1 of the sensor portion 2 to a constant value when assembling the sensor, and therefore the electromagnetic rotation sensor of a high precision can not be obtained. The problem caused by the positional displacement between the cover 6 and the sensor portion 2 due to the compressive deformation is also encountered with the type of sensor (FIG. 6) in which a sensor portion 2 is molded into a right cylindrical shape, and a cover 6 has a right cylindrical shape.

SUMMARY OF THE INVENTION

It is an object of this invention to provide an electromagnetic rotation sensor which can be assembled with a high precision.

According to the present invention, there is provided an electromagnetic rotation sensor comprising (i): a sensor portion for detecting a rotational speed of a rotating member through a detection gear connected to the rotating member; (ii) a connector portion having a contact for connection to an external circuit which contact is exposed at an outer surface of the sensor portion, the sensor portion and the connector portion being molded of a resin integrally with each other to provide a resin-molded structure; and (iii) a cover fixedly receiving the resin-molded structure in such a manner that the cover covers the sensor portion and the detection gear, with the connector portion exposed to the outside of the cover;

wherein a primary molded portion is molded of a resin to provide the sensor portion, with the contact exposed to the outside of the primary molded portion; the primary molded portion is inserted into the cover, with the contact extending outwardly of the cover through a sensor portion-positioning hole formed through a wall of the cover; and a secondary molded portion is molded of a resin to form the connector portion on the primary molded portion in such a manner that a peripheral edge portion of the sensor portion-positioning hole is fixedly held between the primary molded portion and the secondary molded portion and that a socket portion enclosing the exposed contact and adapted to receive a mating connector is formed at the connector portion.

With this arrangement, the cover can be fixed to the sensor portion and the connector portion without the need for compressive deformation or the like of the cover, thereby overcoming the problems with the prior art.

BRIEF DESCRIPTION OF THE DRAWINGS

FIG. 3 is an exploded perspective view of a conventional electromagnetic rotation sensor;

FIG. 4A is a perspective view of a sensor portion of the conventional rotation sensor of FIG. 3;

FIG. 4B is a cross-sectional view of the conventional rotation sensor of FIG. 3;

DESCRIPTION OF THE PREFERRED EMBODIMENTS

Figure 1A:
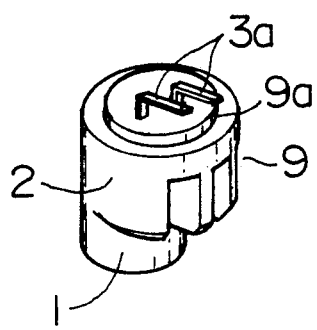
FIG. 1A is a perspective view of a sensor portion of an electromagnetic rotation sensor according to the present invention.
Figure 1B:
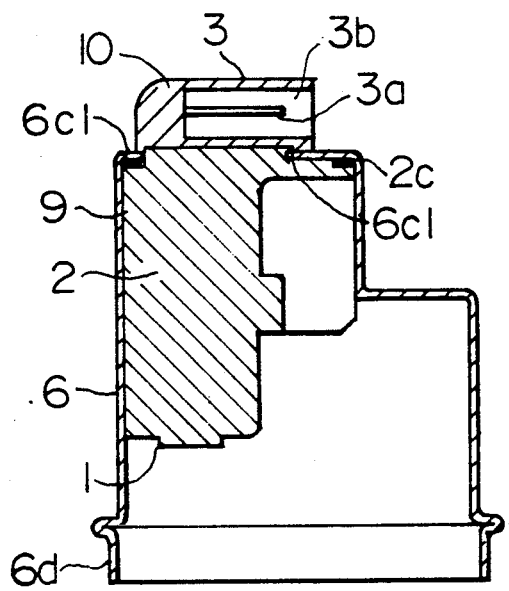
FIG. 1B is a cross-sectional view of the rotation sensor in its assembled condition.

An electromagnetic rotation sensor shown in FIGS. 1A and 1B comprises a sensor portion 2 having a detection portion 1, and a connector portion 3 having contacts 3a for connection to an external circuit. Although not shown in FIGS. 1A and 1B, a detection gear as designated at 5 in the above-mentioned conventional sensor is provided within a cover 6 in opposed relation to the detection portion 1. First, a primary molded portion 9 is molded of a resin to provide the sensor portion 2 in such a manner that a positioning projection 9a of a circular shape for positioning the sensor portion 2 relative to the cover 6 is formed on the upper end of the primary molded portion 9. The contacts 3a, forming a circuit for the detection portion 1 and constituting the connector portion 3, are exposed at the positioning projection 9a. Then, the primary molded portion 9 is inserted into the cover 6 of metal, with the positioning projection 9a of the primary molded portion 9 fitted in a sensor portion-positioning hole 6c formed through an upper wall of the cover 6, as shown in FIG. 1B. Then, a waterproof packing 2c is urged downward by the cover 6, and in this condition a secondary molded portion 10 is molded of a resin to provide the connector portion 3 in such a manner that a peripheral edge portion 6cl of the sensor portion-positioning hole 6c is held between the upper end surface of the primary molded portion 9 and the secondary molded portion 10 and that a socket portion 3b enclosing the contacts 3 is formed. A mating connector is adapted to be inserted into the socket portion 3b.

As described above, the peripheral edge portion 6cl of the sensor portion-positioning hole 6c is fixedly held between the primary molded portion 9, constituting the sensor portion 2, and the secondary molded portion 10 constituting the connector portion 3, so that the cover 6 containing the sensor portion 2 therein is fixed relative to the sensor portion 2 and the connector portion 3. Therefore, the fixing of the cover 6 by compressive deformation thereof as in the conventional sensor is not needed at all. Therefore, the cover 6 will not be deformed when assembling the sensor, and the gap between the detection portion 1 and the detection gear 5 will not be changed, and there can be provided the electromagnetic rotation sensor which has a small measurement error, and has constant characteristics.

Figure 2A:
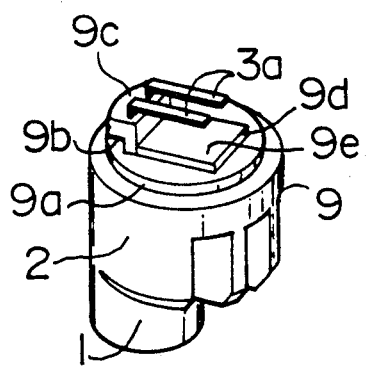
FIG. 2A is view similar to FIG. 1A, but showing a sensor portion of a modified electromagnetic rotation sensor of the invention.
Figure 2B:
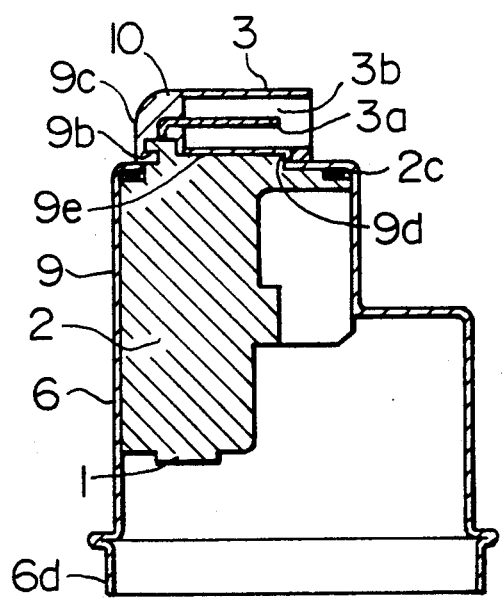
FIG. 2B is a cross-sectional view of the above modified rotation sensor in its assembled condition.
Figure 5A:
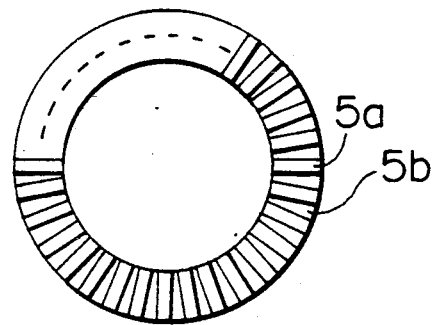
FIG. 5A is a plan view of a detection gear.
Figure 5B:
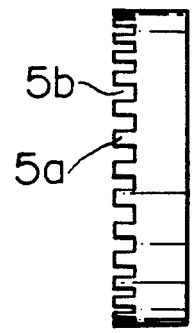
FIG. 5B is a side-elevational view of the detection gear of FIG. 5A.
Figure 6:
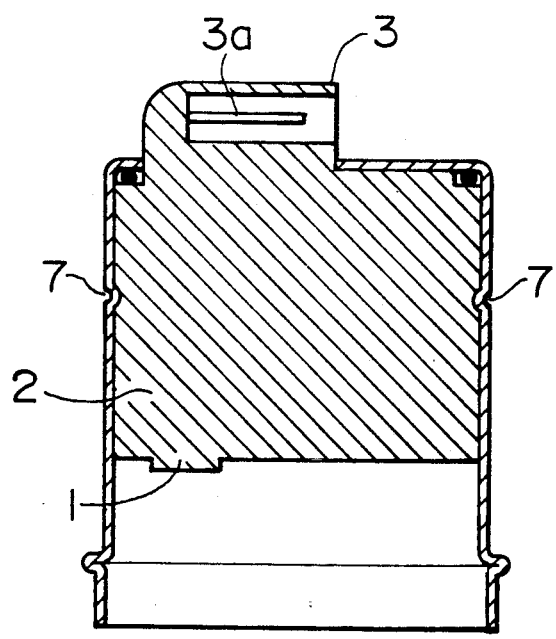
FIG. 6 is a cross-sectional view of another conventional electromagnetic rotation sensor.

FIGS. 2A and 2B show a modified electromagnetic rotation sensor of the invention which is designed to increase the strength of bonding between a primary molded portion and a secondary molded portion. Those portions of this embodiment corresponding to those of the preceding embodiment of FIGS. 1A and 1B are designated by identical reference numerals, respectively. In this embodiment, the primary molded portion 9 is molded to provide a sensor portion 2 in such a manner that a bonding strength-increasing projection 9c having a molding resin-filling notch 9b is formed on an upper surface of a positioning projection 9a at proximal end portions of contacts 3a, and that a bonding strength-increasing bed portion 9e (which has a square shape in this embodiment, but may have a circular shape) having a molding resin-filling groove 9d in its periphery is formed on the upper surface of the positioning projection 9a. Then, the secondary molded portion 10 is molded to provide a connector portion 3, so that the molding resin for the secondary molding flows into the molding resin-filling notch 9b and the molding resin-filling groove 9d to thereby increase the bonding strength between the primary and secondary molded portions 9 and 10.

As described above, in the present invention, there can be provided the electromagnetic rotation sensors which achieve high-precision measurement and have a waterproof function.

What is claimed is:

1. In an electromagnetic rotation sensor comprising: (i) a sensor portion for detecting a rotational speed of a rotating member through a detection gear connected to said rotating member; (ii) a connector portion having a contact for connection to an external circuit which contact is exposed at an outer surface of said sensor portion, said sensor portion and said connector portion being molded of a resin integrally with each other to provide a resin-molded structure; and (iii) a cover fixedly receiving said resin-molded structure in such a manner that said cover covers said sensor portion and said detection gear, with said connector portion exposed to the outside of said cover;

the improvement wherein a primary molded portion is molded of a resin to provide said sensor portion, with said contact exposed to the outside of said primary molded portion; said primary molded portion is inserted into said cover, with said contact extending outwardly of said cover through a sensor portion-positioning hole formed through a wall of said cover; and a secondary molded portion is molded of a resin to form said connector portion on said primary molded portion in such a manner that a peripheral edge portion of said sensor portion-positioning hole is fixedly held between said primary molded portion and said secondary molded portion and that a socket portion enclosing said exposed contact and adapted to receive a mating connector is formed at said connector portion.

2. An electromagnetic rotation sensor according to claim 1, in which said primary molded portion constituting said sensor portion has a positioning projection fitted in said sensor portion-positioning hole to position said sensor portion relative to said cover.

3. An electromagnetic rotation sensor according to claim 1, in which a bonding strength-increasing projection having a molding resin-filling notch is formed on an outer surface of said primary molded portion disposed outwardly of said cover, the resin for forming said secondary molded portion being filled in said molding resin-filling notch when said secondary molded portion is formed on said primary molded portion, thereby increasing the strength of bonding between said primary and secondary molded portions.

4. An electromagnetic rotation sensor according to claim 1, in which a bonding strength-increasing bed portion having a molding resin-filling groove in its periphery is formed on an outer surface of said primary molded portion disposed outwardly of said cover, the resin for forming said secondary molded portion being filled in said molding resin-filling groove when said secondary molded portion is formed on said primary molded portion, thereby increasing the strength of bonding between said primary and secondary molded portions.

5. An electromagnetic rotation sensor according to claim 1, in which a bonding strength-increasing projection having a molding resin-filling notch is formed on an outer surface of said primary molded portion disposed outwardly of said cover, a bonding strength-increasing bed portion having a molding resin-filling groove in its periphery being formed on an outer surface of said primary molded portion disposed outwardly of said cover, the resin for forming said secondary molded portion being filled in said molding resin-filling notch and said molding resin-filling groove when said secondary molded portion is formed on said primary molded portion, thereby increasing the strength of bonding between said primary and secondary molded portions.

* * * * *